Hoyt & Van Cleef,
Vault Cover.
No. 88,386.             Patented Mar. 30, 1869.
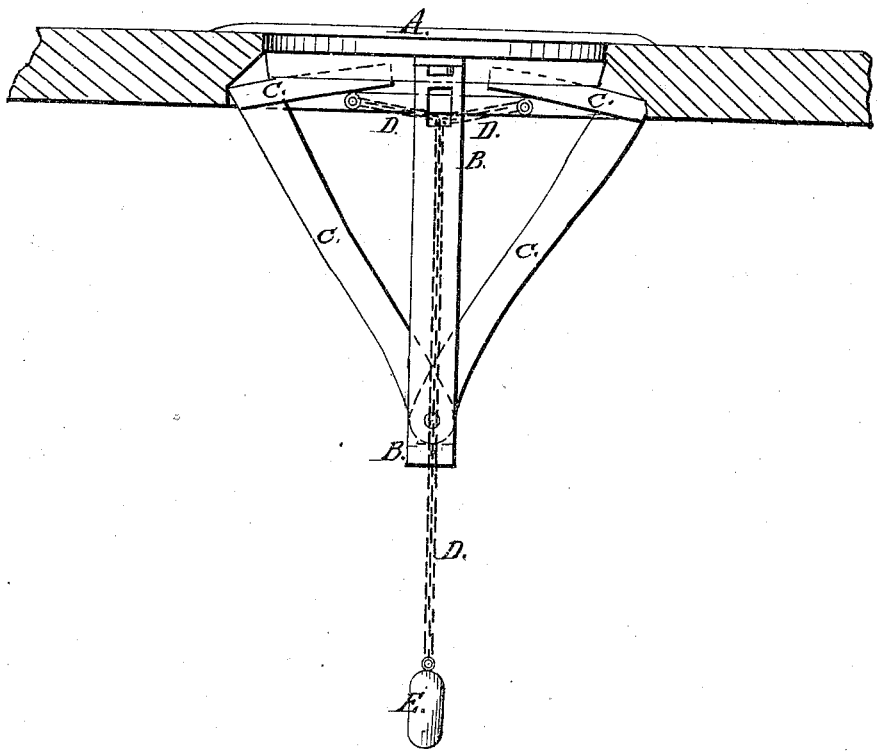
Witnesses:
A.W. Almquist
Wm. A. Morgan.
Inventors:
Morison Hoyt.
G. Van Cleef.
per Munn & Co.
Attorneys.

MORISON HOYT, OF BROOKLYN, AND G. VAN CLEEF, OF NEW YORK, N. Y., ASSIGNORS TO THEMSELVES AND J. T. LOCKHART, OF NEW YORK CITY.

Letters Patent No. 88,386, dated March 30, 1869.

IMPROVED VAULT-COVER.

The Schedule referred to in these Letters Patent and making part of the same.

*To all whom it may concern:*

Be it known that we, MORISON HOYT, of Brooklyn, in the county of Kings, and State of New York, and G. VAN CLEEF, of the city, county, and State of New York, have invented a new and improved Self-Locking Cover for Coal-Holes, Scuttles, &c.; and we do hereby declare that the following is a full, clear, and exact description thereof, which will enable others skilled in the art to make and use the same, reference being had to the accompanying drawing, forming part of this specification.

The figure is a side view of our improved cover.

Our invention has for its object to furnish an improved self-locking cover for coal-holes, scuttles, &c., which shall be so constructed as to fasten itself, when dropped into place, without the possibility of failure, and in such a way that the cover cannot be removed from the outside; and It consists principally in the combination of the pivoted angular arms and standard with the cover, as as hereinafter more fully described.

A is the cover, which is made in the ordinary manner, and of such a size and shape as to fit into the hole, or opening to be covered, or closed.

To the central part of the lower side of the cover A is securely attached the upper end of the arm, or standard B, to the lower end of which is pivoted the lower ends of the arms C, which are made angular in form, as shown in the figure, their upper parts passing in toward the centre of the cover A, and being of such a length that when drawn fully in, the angles of the said arms C will be within the outer edges of the cover A, so that the said cover may be conveniently placed in and removed from its place.

The upper or inwardly-projecting parts of the pivoted arms C work in guide-grooves formed in or upon the under side of the cover A.

The effect of this construction and arrangement of the angular pivoted arms C is, that when they are left free they will swing outward, and when the cover A is dropped into its place, the outwardly-projecting angles of said arms will pass beneath the edge of the hole, or opening to be covered, which said edge should be bevelled off to receive them, and should be formed with a shoulder to serve as a stop for the angle of the said arms to rest against, to prevent the said arms from swinging out too far.

D is a chain, which passes through a hole or over a guide-pulley in the upper part of the standard, or arm B, and the upper part of which is branched, the ends of the said branches being attached to the inner ends of the angular arms C, as shown in the figure.

From the lower end of the chain D is suspended a small weight, E, of such a size as to keep the chain D taut, but which should not be so heavy as to draw the arms C inward.

The length of the chain D should be such that its lower end may be conveniently reached to draw the arms C inward, to allow the cover A to be removed.

By this construction, it will be impossible to remove the cover A without first drawing in the arms C, which cannot be done from the outer side.

By this construction, also, however carelessly the cover A may be dropped into its place, the angular arms C will at once lock the said cover, rendering it impossible for the most careless person to put on the cover without fastening it.

We claim as new, and desire to secure by Letters Patent—

1. The combination of the standard B and pivoted angular arms C with each other and with the cover A, said parts being constructed and operating substantially as herein shown and described and for the purpose set forth.

2. The combination of the weighted chain D, or equivalent, with the arms C and standard B of the cover A, substantially as herein shown and described, and for the purpose set forth.

The above specification of our invention signed by us, this 29th day of December, 1868.

MORISON HOYT.
G. VAN CLEEF.

Witnesses:
E. GREENE COLLINS,
JAMES T. GRAHAM.